US010535460B2

(12) United States Patent
Hirabayashi et al.

(10) Patent No.: US 10,535,460 B2
(45) Date of Patent: Jan. 14, 2020

(54) REACTOR

(71) Applicants: AutoNetworks Technologies, Ltd., Yokkaichi, Mie (JP); Sumitomo Wiring Systems, Ltd., Yokkaichi, Mie (JP); SUMITOMO ELECTRIC INDUSTRIES, LTD., Osaka (JP)

(72) Inventors: Tatsuo Hirabayashi, Mie (JP); Takashi Misaki, Mie (JP); Seiji Shitama, Mie (JP); Shinichiro Yamamoto, Mie (JP)

(73) Assignees: Autonetworks Technologies, Ltd., Yokkaichi, Mie (JP); Sumitomo Wiring Systems, Ltd., Yokkaichi, Mie (JP); Sumitomo Electric Industries, Ltd., Osaka-shi, Osaka (JP)

( * ) Notice: Subject to any disclaimer, the term of this patent is extended or adjusted under 35 U.S.C. 154(b) by 138 days.

(21) Appl. No.: 15/910,153

(22) Filed: Mar. 2, 2018

(65) Prior Publication Data

US 2018/0261370 A1    Sep. 13, 2018

(30) Foreign Application Priority Data

Mar. 7, 2017  (JP) ................................. 2017-043121

(51) Int. Cl.
| | |
|---|---|
| *H01F 27/24* | (2006.01) |
| *H01F 27/02* | (2006.01) |
| *H01F 41/00* | (2006.01) |
| *H01F 27/28* | (2006.01) |
| *B29C 45/14* | (2006.01) |

(52) U.S. Cl.
CPC ........... *H01F 27/022* (2013.01); *H01F 27/24* (2013.01); *H01F 27/28* (2013.01); *H01F 41/005* (2013.01); *B29C 45/14467* (2013.01); *B29K 2995/0008* (2013.01)

(58) Field of Classification Search
CPC .................................... H01F 27/00–36
USPC ................ 336/65, 83, 90, 92, 96, 210–215, 336/220–223, 233–234
See application file for complete search history.

(56) References Cited

U.S. PATENT DOCUMENTS

| | | | | |
|---|---|---|---|---|
| 9,679,694 B2* | 6/2017 | Kitami | ..................... | H01F 27/24 |
| 2013/0181801 A1* | 7/2013 | Yoshikawa | ............. | H01F 27/30 336/180 |

(Continued)

FOREIGN PATENT DOCUMENTS

JP           2013-135191 A        7/2013

*Primary Examiner* — Tuyen T Nguyen
(74) *Attorney, Agent, or Firm* — Honigman LLP

(57) ABSTRACT

Provided is a reactor with enhanced strength. The reactor includes a coil, a magnetic core, an interposed member interposed between the coil and the magnetic core, and a resin mold portion. The interposed member includes a frame portion that has a first through hole, and a plate-shaped portion. The resin mold portion includes an interposed resin portion that is formed by a constituent resin of the resin mold portion being filled inside the first through hole, an inner side resin portion is formed by the constituent resin being filled inside a portion of a coil interior space, and an outer side resin portion. The plate-shaped portion includes an interposed wall portion, and a second through hole that is provided locally in a portion other than the interposed wall portion, and inside of which the constituent resin is filled.

8 Claims, 10 Drawing Sheets

(56) References Cited

U.S. PATENT DOCUMENTS

2017/0271075 A1* 9/2017 Kitami ................... H01F 27/24
2019/0027295 A1* 1/2019 Hirabayashi ............ H01F 37/00
2019/0131058 A1* 5/2019 Hirabayashi ........ H01F 27/2876

* cited by examiner

[Fig 1]
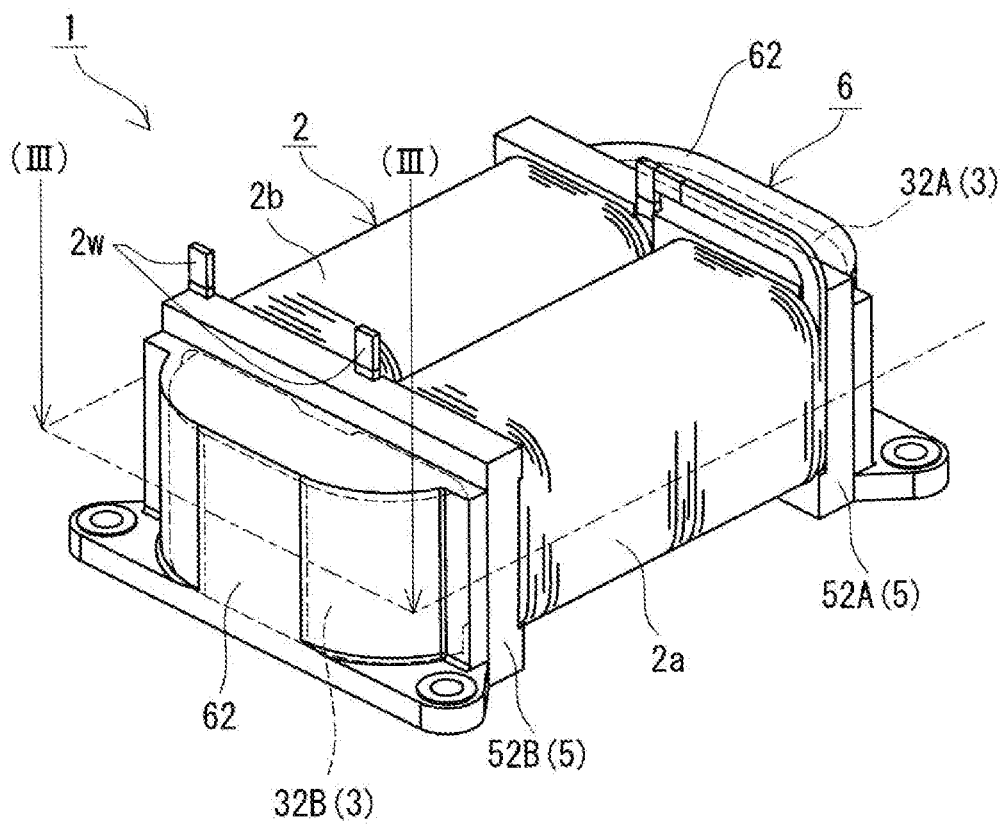

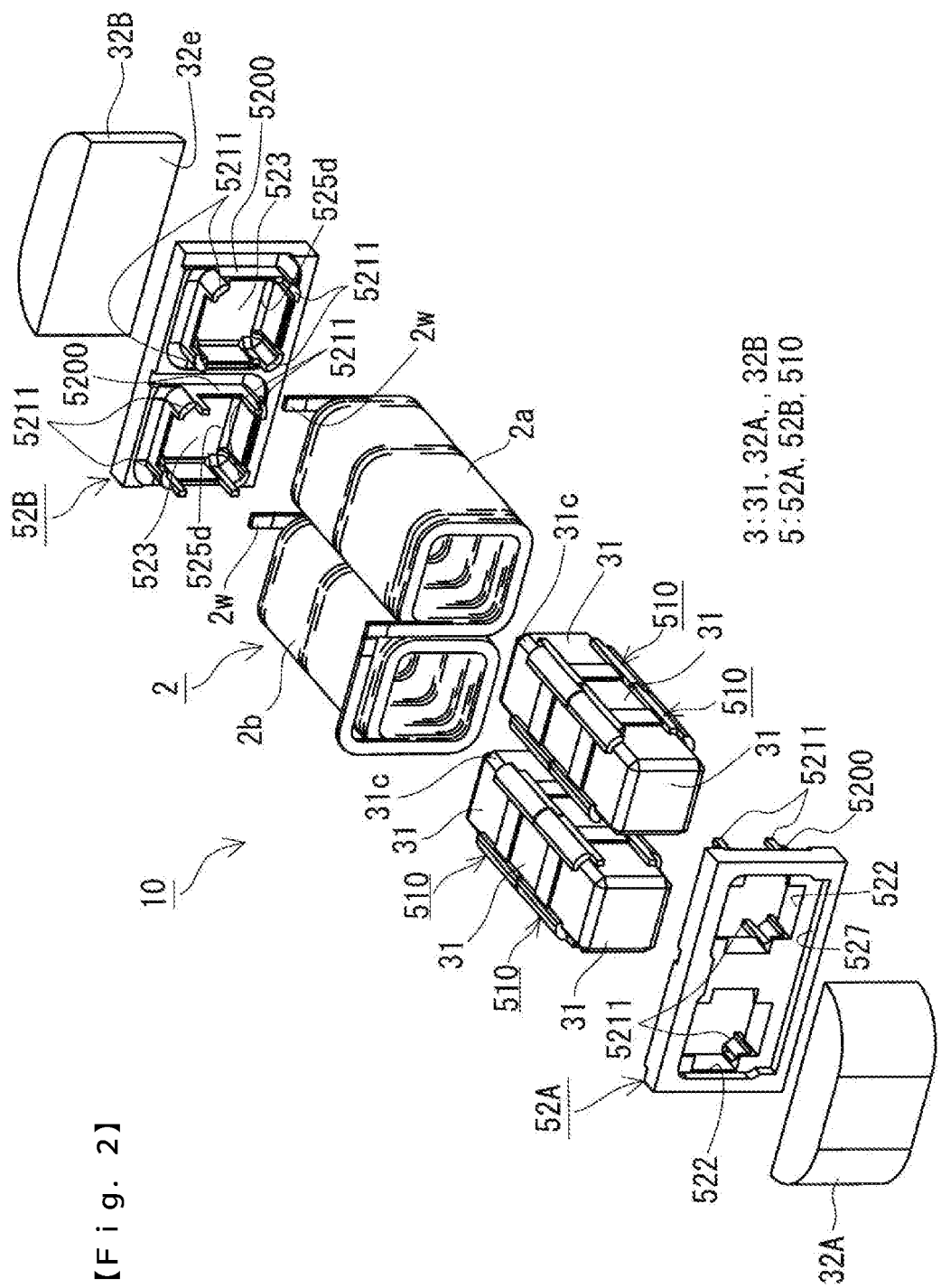
[Fig. 2]

[Fig. 3]
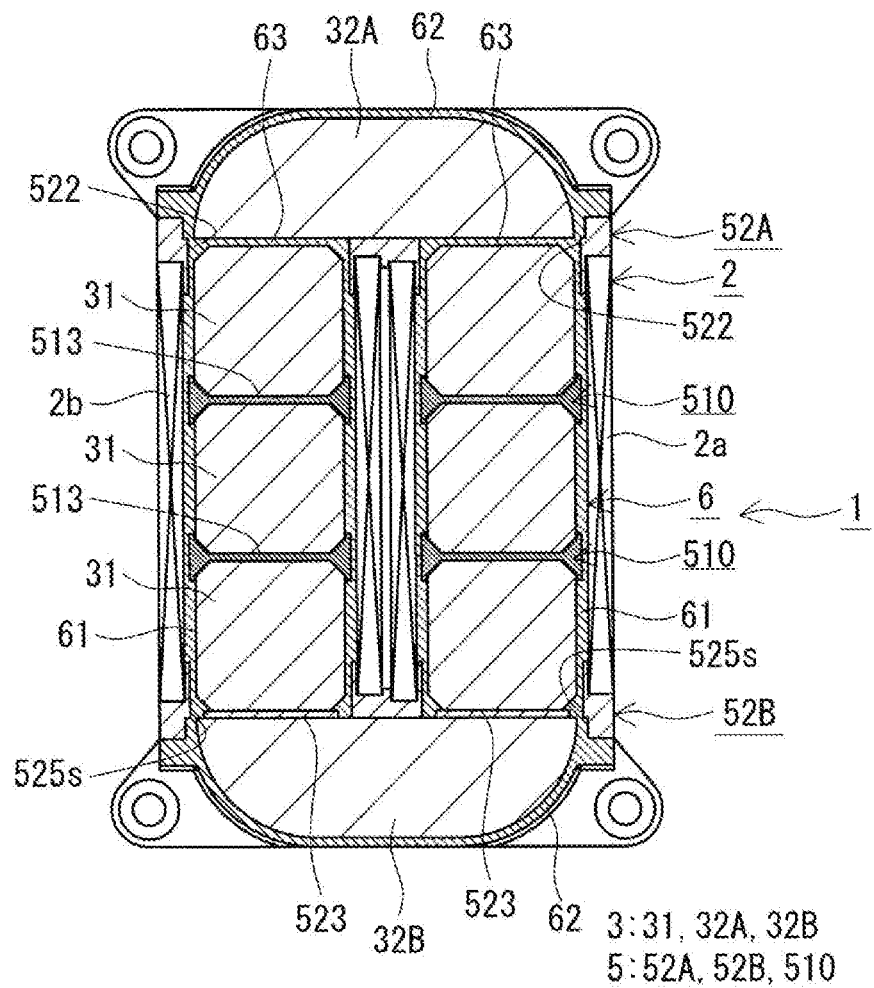

[Fig. 4]
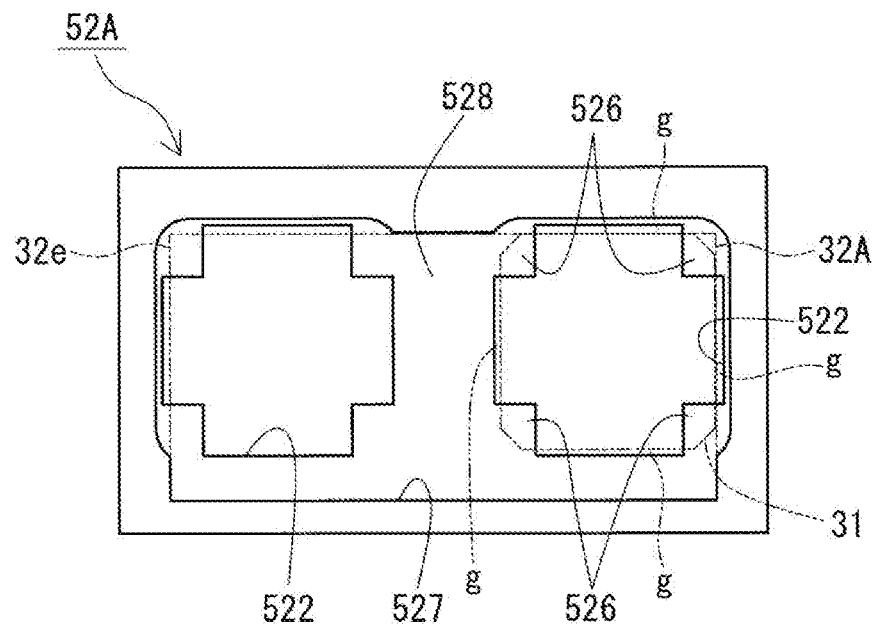
[Fig. 5]
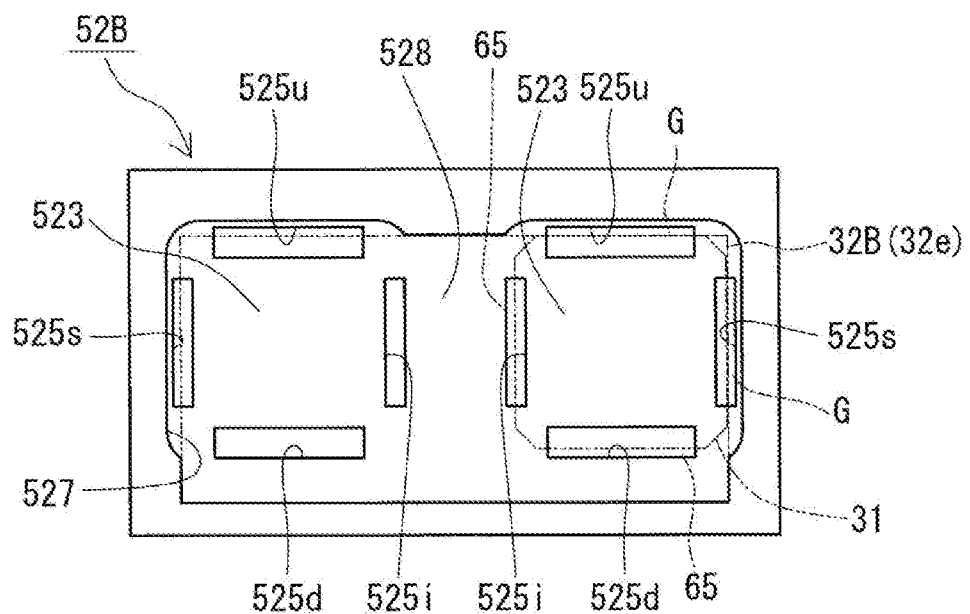

[Fig. 6]
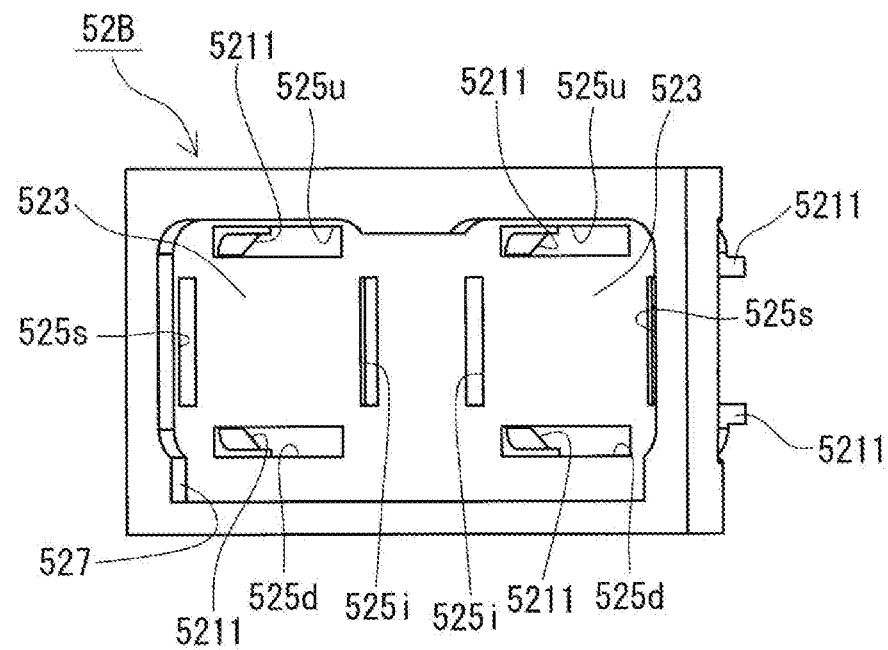
[Fig. 7]
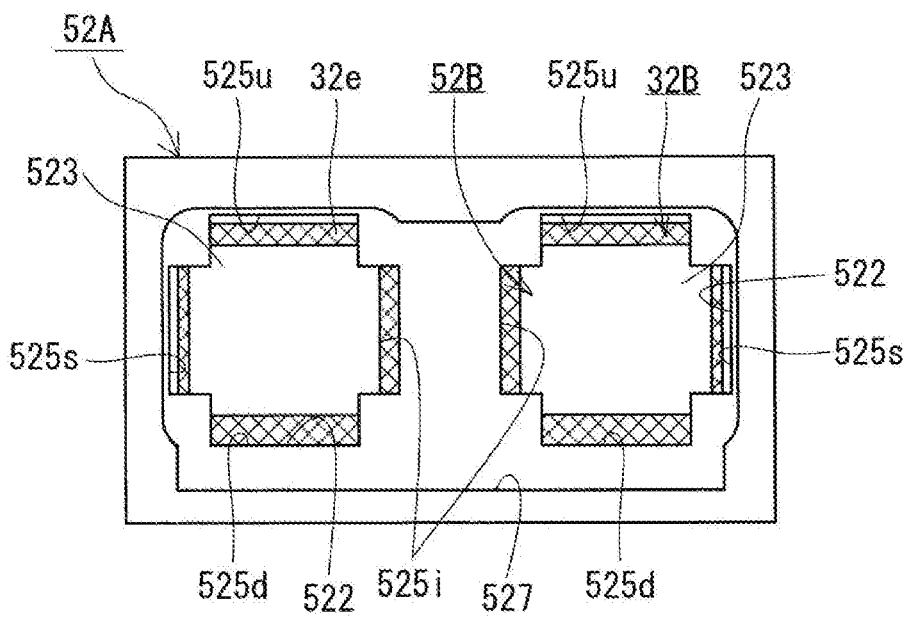

[Fig. 8]
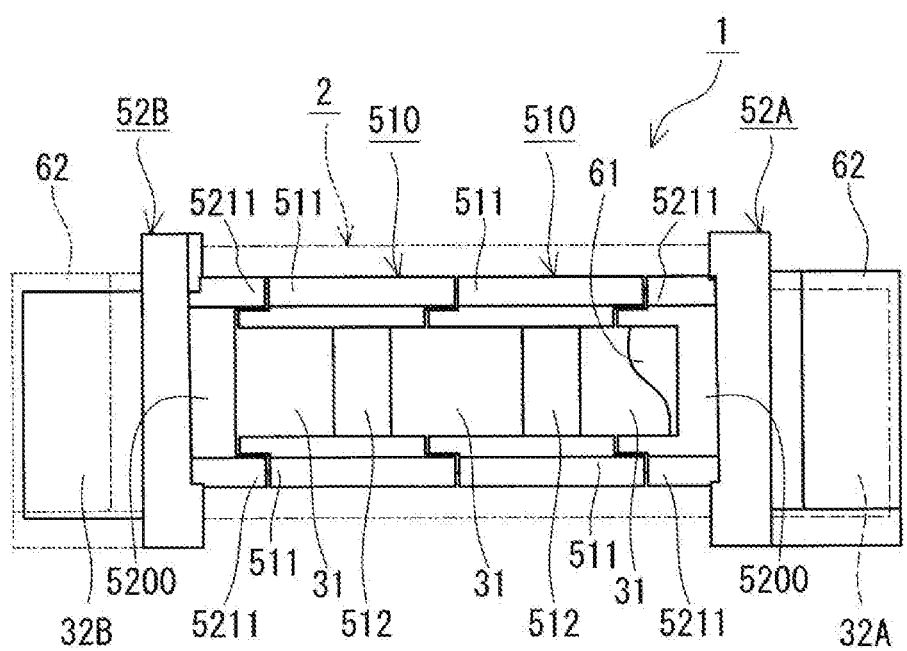

[Fig. 9]
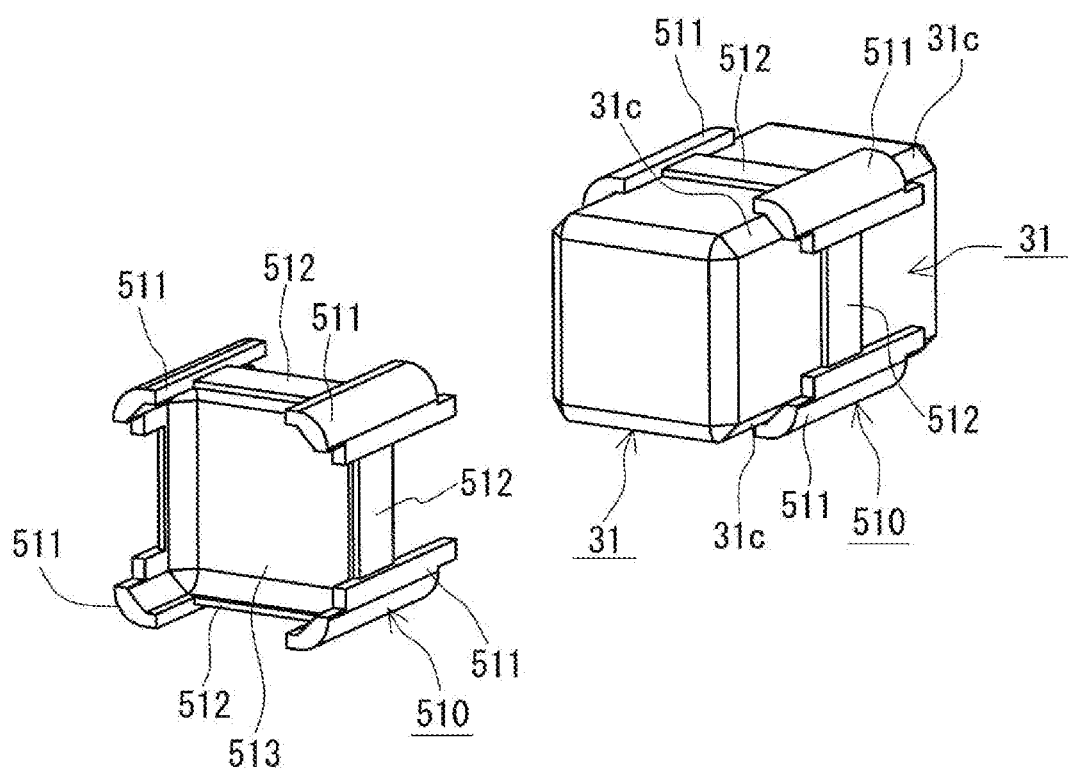

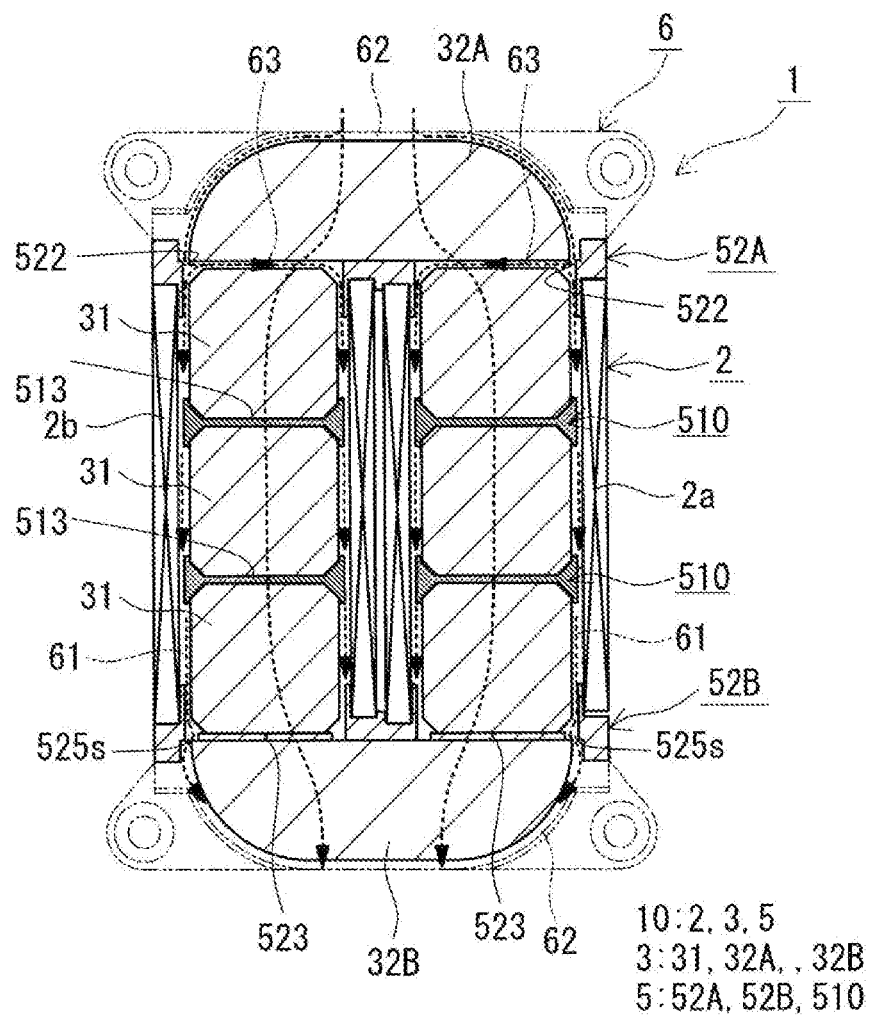
[Fig. 10]

[Fig. 11]
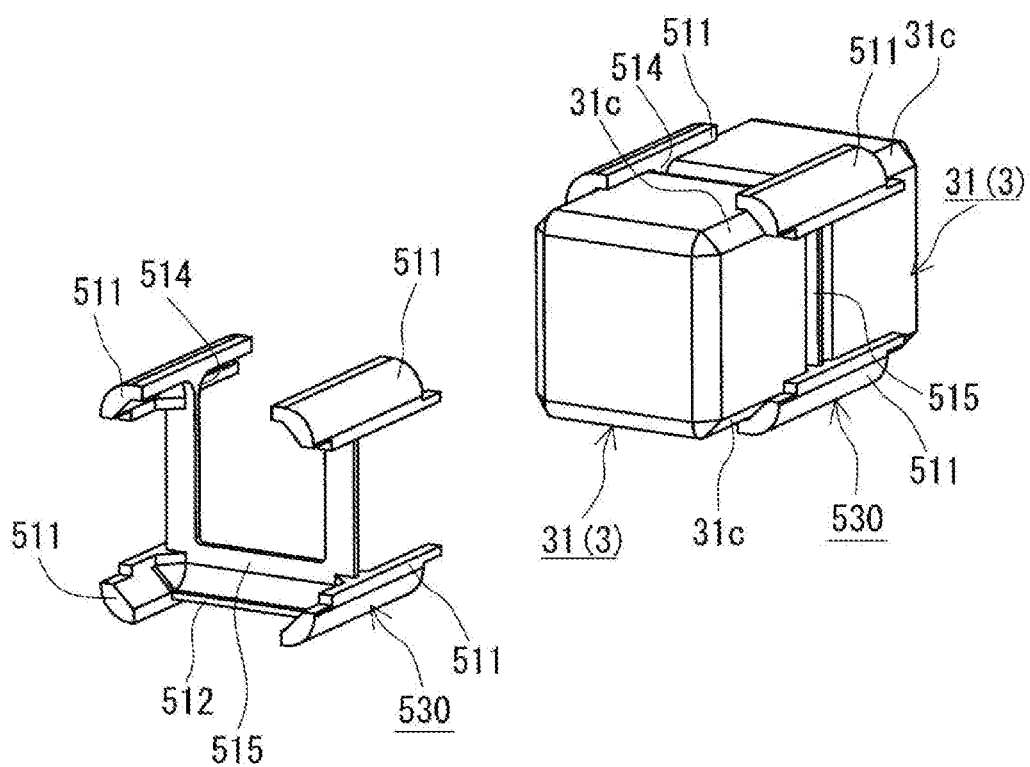

【Fig. 12】
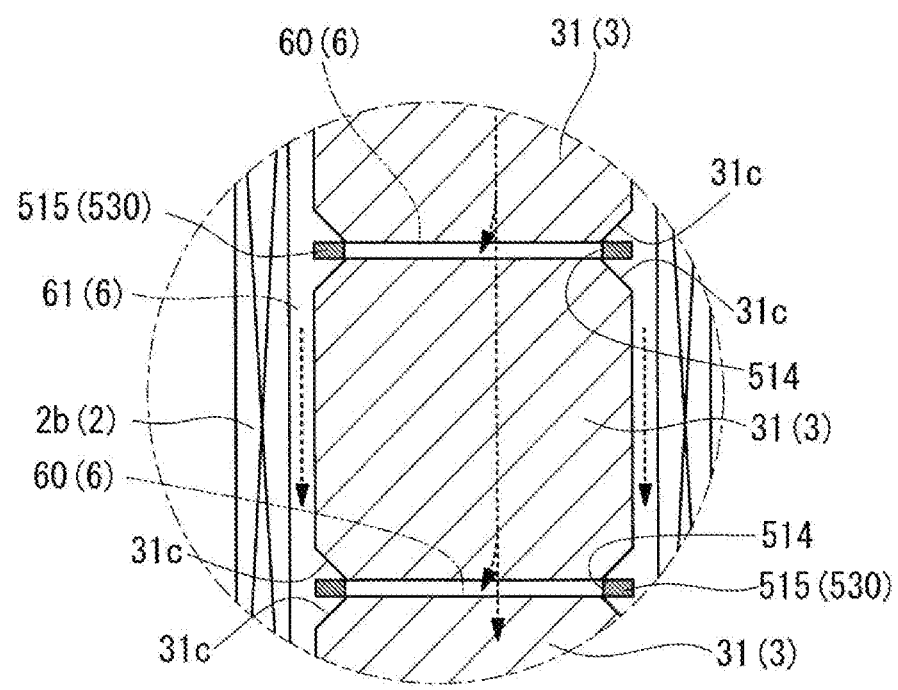

REACTOR

CROSS-REFERENCE TO RELATED APPLICATIONS

This application claims priority of Japanese Patent Application No. JP 2017-043121 filed on Mar. 7, 2017.

TECHNICAL FIELD

The present invention relates to a reactor.

BACKGROUND

As a reactor for a vehicle-mounted converter, JP 2013-135191A discloses a reactor including a coil including a pair of wound portions (coil elements) formed by windings wound in a spiral shape, a magnetic core including a plurality of core pieces assembled in an annular shape, a bobbin interposed between the wound portions and the magnetic core, and a resin mold portion that covers a combined body of the coil and the magnetic core. The magnetic core includes a plurality of inner core pieces disposed inside each of the wound portions, a gap plate interposed between adjacent core pieces, and two outer core pieces disposed outside the wound portions. The above-described bobbin includes a pair of frame-shaped bobbins that are interposed between the wound portions and the outer core pieces, and that are provided with two through holes into which ends of the inner core pieces are inserted, and an inner side bobbin disposed in a coil interior space located between the wound portions and a columnar combination in which the plurality of inner core pieces and the gap plate are assembled.

SUMMARY

The strength of a reactor needs to be further increased.

In a reactor including a magnetic core formed by the inner core pieces and the outer core pieces being assembled as described above, the rigidity of the magnetic core can be increased, for example, by integrating the plurality of core pieces using the resin mold portion. To form the resin mold portion, it is conceivable, for example, to use the through holes of the above-described pair of frame-shaped bobbins and the above-described coil interior space as a flow path for unsolidified resin. However, in this case, depending on the conditions of the resin introduction, there is the possibility that flows of unsolidified resin having different flow directions will merge between the inner core pieces and the outer core pieces, thus forming welds. The welds and the vicinity thereof tend to be vulnerable in terms of strength.

Therefore, an object is to provide a reactor having enhanced strength.

A reactor according to the present disclosure includes: a coil including a wound portion; a magnetic core including at least one inner core piece disposed inside the wound portion, and a first outer core piece and a second outer core piece that are disposed outside the wound portion and that sandwich the inner core piece therebetween; an interposed member interposed between the coil and the magnetic core; and a resin mold portion that covers at least a portion of a combination of the first outer core piece, the inner core piece, and the second outer core piece. The interposed member includes: a frame portion that has a first through hole in communication with front and back sides thereof, and that is interposed between the first outer core piece and the wound portion; and a plate-shaped portion interposed between the wound portion and the second outer core piece, the resin mold portion includes: an interposed resin portion that is formed by a constituent resin of the resin mold portion being filled inside the first through hole, and that is sandwiched between the first outer core piece and the inner core piece; an inner side resin portion that is formed by the constituent resin of the resin mold portion being filled inside a portion of a coil interior space located between the wound portion and the inner core piece; and an outer side resin portion that covers at least a portion of the first outer core piece and at least a portion of the second outer core piece, and the plate-shaped portion includes: an interposed wall portion sandwiched between the inner core piece and the second outer core piece; and a second through hole that is provided locally in a portion other than the interposed wall portion, and inside of which the constituent resin of the resin mold portion is filled.

The above-described reactor has enhanced strength.

BRIEF DESCRIPTION OF THE DRAWINGS

FIG. 1 is a schematic perspective view showing a reactor of Embodiment 1;

FIG. 2 is an exploded perspective view of a combined body included in the reactor of Embodiment 1;

FIG. 3 is a vertical cross-sectional view of the reactor of Embodiment 1, taken along the section lines (III)-(III) shown in FIG. 1;

FIG. 4 is a front view of a frame portion included in the reactor of Embodiment 1, as viewed from the side of a first outer core piece;

FIG. 5 is a front view of a plate-shaped portion included in the reactor of Embodiment 1, as viewed from the second outer core piece side;

FIG. 6 is a perspective view of the plate-shaped portion included in the reactor of Embodiment 1, as viewed from the side of a second outer core piece;

FIG. 7 is a front view of a combination of the frame portion, the plate-shaped portion, and the second outer core piece included in the reactor of Embodiment 1, as viewed from the first outer core piece side;

FIG. 8 is a schematic side view showing the reactor of Embodiment 1;

FIG. 9 is an exploded perspective view of inner core pieces and inner side divided pieces included in the reactor of Embodiment 1;

FIG. 10 is an explanatory diagram illustrating flows of unsolidified resin in a manufacturing process of the reactor of Embodiment 1;

FIG. 11 is an exploded perspective view of inner core pieces and inner side divided pieces included in a reactor according to Embodiment 2; and FIG. 12 is a partial vertical cross-sectional view of the reactor of Embodiment 2, taken along a cross section parallel to an axial direction of a wound portion, showing a part of the interior of the wound portion.

PREFERRED EMBODIMENTS OF THE INVENTION

Description of Embodiments of the Present Invention

First, aspects of the present invention will be listed and described.

(1) A reactor according to an embodiment of the present invention includes: a coil including a wound portion; a magnetic core including at least one inner core piece disposed inside the wound portion, and a first outer core piece and a second outer core piece that are disposed outside the wound portion and that sandwich the inner core piece therebetween; an interposed member interposed between the coil and the magnetic core; and a resin mold portion that covers at least a portion of a combination of the first outer core piece, the inner core piece, and the second outer core piece. The interposed member includes: a frame portion that has a first through hole in communication with front and back sides thereof, and that is interposed between the first outer core piece and the wound portion; and a plate-shaped portion interposed between the wound portion and the second outer core piece, the resin mold portion includes: an interposed resin portion that is formed by a constituent resin of the resin mold portion being filled inside the first through hole, and that is sandwiched between the first outer core piece and the inner core piece; an inner side resin portion that is formed by the constituent resin of the resin mold portion being filled inside a portion of a coil interior space located between the wound portion and the inner core piece; and an outer side resin portion that covers at least a portion of the first outer core piece and at least a portion of the second outer core piece, and the plate-shaped portion includes: an interposed wall portion sandwiched between the inner core piece and the second outer core piece; and a second through hole that is provided locally in a portion other than the interposed wall portion, and inside of which the constituent resin of the resin mold portion is filled.

While the above-described reactor includes a plurality of core pieces, namely the inner core piece, the first outer core piece, and the second outer core piece, the reactor includes the inner side resin portion and the outer side resin portion, and each of the core pieces has a region covered by the resin mold portion. The above-described reactor includes the frame portion having the first through hole and the plate-shaped portion having the second through hole. Accordingly, in the forming process of the above-described resin mold portion, the first through hole of the frame portion, the coil interior space, and the second through hole of the plate-shaped portion can be used as a flow path of unsolidified resin from the first outer core piece side, and unidirectional introduction from the first outer core piece toward the second outer core piece can be performed. The resin mold portion formed in this manner is provided so as to extend continuously from the first outer core piece side to the second outer core piece side through the first through hole, the coil interior space, and the second through hole. The above-described reactor includes a magnetic core in which the above-described core pieces are integrated by such a resin mold portion. Further, if the resin mold portion is formed under specific conditions as described above, substantially no weld will be formed between the first outer core piece and the inner core piece, and between the inner core piece and the second outer core piece (the details of which will be described later). Here, if a weld is present, thermal stress may be applied to the resin mold portion due to the heat generated by the coil during energization when the reactor is used. This thermal stress may cause cracking in the weld and the vicinity of thereof. The occurrence of cracking leads to reduced strength. By preventing the generation of welds, it is possible to reduce the occurrence of the above-described cracking, and thus increase the rigidity of the magnetic core integrated by the resin mold portion. The above-described reactor including such a magnetic core has enhanced strength. Further, with the above-described reactor, the insulation between the wound portion and the inner core piece can be enhanced by the inner side resin portion, and the outer core pieces can be protected from the external environment or can be mechanically protected by the outer side resin portion.

(2) An example of the above-described reactor may be a configuration wherein the interposed member includes an inner side interposed portion disposed in the coil interior space, the inner side interposed portion includes a partition portion that divides the coil interior space in a circumferential direction thereof, and the inner side resin portion is provided in a region on two sides of the partition portion.

The coil interior space in the above-described configuration is divided by the partition portion of the inner side interposed portion in the circumferential direction thereof. Accordingly, by performing the above-described unidirectional introduction, it is possible to prevent flows of unsolidified resin from merging in the circumferential direction of the coil interior space. The above-described configuration that can also prevent the generation of welds in the coil interior space can further increase the rigidity of the magnetic core integrated by the resin mold portion, and thus has enhanced strength. Since the above-described configuration includes the inner side interposed portion, the insulation between the wound portion and the inner core piece can be further improved.

(3) An example of the reactor in (2) above may be a configuration wherein the magnetic core includes a plurality of the inner core pieces, the inner side interposed portion includes a plurality of inner side divided pieces that each include an inner side wall portion interposed between adjacent ones of the inner core pieces, and a projecting piece coupled to the inner side wall portion and disposed on an outer circumferential surface of the inner core piece, and the partition portion is formed by the projecting pieces of the adjacent ones of the inner side divided pieces being engaged with each other.

In the manufacturing process of the above-described configuration, the above-described partition portion can be easily constructed by engaging the projecting pieces of adjacent inner side divided pieces with each other. Moreover, the engaged state can be maintained so as to prevent flows of unsolidified resin from merging in the circumferential direction of the coil interior space. While the above-described configuration includes a plurality of inner side divided pieces, a small portion is disposed on the outer circumference of the inner core piece, and a large contact area between the inner side divided piece and the inner side resin portion can be easily ensured, making it possible to further increase the rigidity of the magnetic core integrated by the resin mold portion. Accordingly, the above-described configuration has further enhanced strength, and it is easy to hold the inner core pieces at an appropriate distance by using the inner side wall portion, and thus the inductance is unlikely to vary.

(4) An example of the reactor in (3) above may be a configuration wherein the inner side wall portion of at least one of the plurality of inner side divided pieces includes, between the adjacent ones of the inner core pieces, a notch inside of which the constituent resin of the resin mold portion is filled, and the resin mold portion includes a resin gap portion formed by the constituent resin of the resin mold portion being filled inside the notch between the inner core pieces.

The above-described configuration can increase the contact area between the inner core piece and the resin mold portion by the resin gap portion interposed between the inner core pieces as compared with the case where the notch is not provided, can further increase the rigidity of the magnetic core integrated by the resin mold portion, and thus has further enhanced strength. Depending on the shape of the notch (see Embodiment 2 described below), it is possible to prevent merging of flows of unsolidified resin between the inner core pieces, so that the above-described configuration has further enhanced strength.

(5) An example of the above-described reactor may be a configuration wherein the plate-shaped portion further includes a third through hole, and the resin mold portion includes a third interposed resin portion that is formed by the constituent resin of the resin mold portion being filled inside the third through hole, and that is sandwiched between the inner core piece and the second outer core piece.

The above-described configuration can increase the contact area between the plate-shaped portion and the resin mold portion by using the third interposed resin portion, as compared with the case where the third interposed resin portion is not provided, and also can increase the contact area between the inner core piece, the second outer core piece, and the resin mold portion. Accordingly, the above-described configuration can further increase the rigidity of the magnetic core integrated by the resin mold portion, and thus has further enhanced strength.

DETAILS OF EMBODIMENTS OF THE PRESENT INVENTION

Hereinafter, embodiments of the present invention will be described in detail with reference to the accompanying drawings. In the drawings, identical reference numerals denote identical parts.

Embodiment 1

A reactor 1 of Embodiment 1 will be described with reference to FIGS. 1 to 10.

FIG. 2 is an exploded view of a combined body 10 including a coil 2, an inner core piece 31, a first outer core piece 32A, and a second outer core piece 32B that constitute a magnetic core 3, and an interposed member 5, before a resin mold portion 6 is formed. FIG. 1 shows a state in which the first outer core piece 32A is disposed on the right side on the sheet, whereas FIG. 2 shows a state in which the first outer core piece 32A is disposed on the left side on the sheet.

FIG. 3 shows the reactor 1 shown in FIG. 1, and FIG. 10 shows the combined body 10, both in a state of being cut along the plane parallel to the axial direction of wound portions 2*a* and 2*b*.

FIG. 7 shows a state in which a frame portion 52A, a plate-shaped portion 52B, and the second outer core piece 32B are arranged and viewed from the first outer core piece 32A side (the front side of the sheet). For ease of viewing, the second outer core piece 32B is cross-hatched.

FIG. 8 is a side view of the reactor 1, with the coil 2 shown in phantom (see the dashed double-dotted lines) and the resin mold portion 6 being partly cut-out to show the right side only, for ease of viewing of the interior of the wound portion. On the left side in FIG. 8, the illustration of the inner side resin portion 61 is omitted, and the outer side resin portion 62 is shown in phantom (see the dashed double-dotted lines).

FIG. 9 only shows two inner core pieces 31 and two inner side divided pieces 510.

In the following description, the side of the reactor 1 that comes into contact with an installation target is referred to as "lower side", and the side opposite thereto is referred to as "upper side". FIG. 1 illustrates a case where the lower side of the drawing is the installation side of the reactor 1.

Reactor

Overview

As shown in FIG. 1, the reactor 1 of Embodiment 1 includes a coil 2 including a pair of wound portions 2*a* and 2*b*, a magnetic core 3 including a plurality of core pieces disposed inside and outside of the wound portions 2*a* and 2*b*, an interposed member 5 interposed between the coil 2 and the magnetic core 3, and a resin mold portion 6 that covers at least a part of a combination of the core pieces. Typically, the reactor 1 is mounted to an installation target (not shown) such as a converter case for use.

As shown in FIG. 2, the magnetic core 3 includes at least one inner core piece 31 disposed inside each of the wound portions 2*a* and 2*b*, a first outer core piece 32A and a second outer core piece 32B disposed outside the wound portions 2*a* and 2*b*. The magnetic core 3 in the present example includes two columnar inner core piece groups in each of which a plurality of inner core pieces 31 are arranged, and at least one gap portion (the details of which will be described later) interposed between adjacent core pieces. The first outer core piece 32A and the second outer core piece 32B sandwich therebetween the inner core piece groups arranged so as to be spaced from each other, and thus the magnetic core 3 is assembled in an annular shape to form a closed magnetic circuit.

As shown in FIG. 3, the resin mold portion 6 covers at least a portion of a combination of the first outer core piece 32A, the two inner core piece groups, and the second outer core piece 32B. The resin mold portion 6 includes inner side resin portions 61 and 61 formed by a constituent resin of the resin mold portion 6 being filled inside a portion of a coil interior space between the wound portions 2*a* and 2*b* and the inner core piece groups, and outer side resin portions 62 and 62 that cover a part of the first outer core piece 32A and a part of the second outer core piece 32B, respectively. The inner side resin portions 61 and 61 partly cover the inner core piece groups, respectively.

The interposed member 5 in the present example includes inner side interposed portions respectively disposed in the coil interior spaces, and two outer side interposed portions disposed respectively between the first outer core piece 32A and the wound portions 2*a* and 2*b*, and between the wound portions 2*a* and 2*b* and the second outer core piece 32B. In the reactor 1 of Embodiment 1, one outer side interposed portion is disposed on the first outer core piece 32A and the other outer side interposed portion is disposed on the second outer core piece 32B have different shapes. As shown in FIG. 2, the one outer side interposed portion interposed between the first outer core piece 32A and the wound portions 2*a* and 2*b* is a B-shaped frame portion 52A including two first through holes 522, 522 that are in communication with front and back sides thereof. The opening of each first through hole 522 is relatively large so as to allow an end face of the inner core piece 31 to be generally exposed. The other outer side interposed portion interposed between the wound portions 2a and 2b and the second outer core piece 32B is a plate-shaped portion 52B that does not have through holes as large as those of the frame portion 52A, but has locally provided, relatively small through holes (second through holes 525u and 525s, and in the present example, also third through holes 525d and 525i, FIG. 5, FIG. 6). As shown in FIG. 3, the constituent resin of the resin mold portion 6 is filled inside the first through holes 522 and 522 to form interposed resin portions 63 sandwiched between the inner core pieces 31 and the first outer core piece 32A. The plate-shaped portion 52B includes interposed wall portions 523 sandwiched between the inner core pieces 31 and the second outer core piece 32B. The constituent resin of the resin mold portion 6 is filled inside the second through holes 525u and 525s provided in portions other than the interposed wall portions 523 and 523. The resin mold portion 6 in the present example is provided so as to extend continuously from the first outer core piece 32A to the second outer core piece 32B through the first through holes 522 and 522 of the frame portion 52A, a portion of the coil interior spaces, and the second through holes 525u and 525s of the plate-shaped portion 52B. That is, the outer side resin portion 62 of the resin mold portion 6 that is located on the first outer core piece 32A side, the interposed resin portions 63 and 63, the inner side resin portions 61 and 61, the resin portions filled inside the second through holes 525u and 525s (hereinafter occasionally referred to as "second interposed portion"), and the outer side resin portion 62 located on the second outer core piece 32B side are continuous. In the present example, the third through holes 525d and 525i are closed by the second outer core piece 32B (FIG. 7), and the constituent resin of the resin mold portion 6 is filled thereinside (third interposed resin portions 65, FIG. 5).

Since the outer side interposed portions have different shapes as described above, unidirectional introduction toward the second outer core piece 32B side through the first through holes 522 and 522, the coil interior space, and the second through holes 525u and 525s can be performed using the first outer core piece 32A side as the introduction side for the unsolidified resin in the manufacturing process of the resin mold portion 6, as shown in FIG. 10. With this unidirectional introduction, the unsolidified resin will not substantially merge inside the first through holes 522, making it possible to prevent the formation of welds. No large space such as the first through holes 522 is present between the inner core pieces 31 and the second outer core piece 32B, and the interposed wall portions 523 are interposed therebetween. Accordingly, even when the flow of the unsolidified resin toward the second outer core piece 32B through the coil interior space includes a plurality of flows in different directions, the resin flows in different directions will not merge with each other between the inner core pieces 31 and the second outer core piece 32B, making it possible to prevent the formation of welds. By including the frame portion 52A provided with the first through holes 522 and the plate-shaped portion 52B including the interposed wall portions 523, the reactor 1 of Embodiment 1 can reduce the generation of welds during the manufacturing process, thus increasing the rigidity of the magnetic core 3 integrated by the resin mold portion 6.

In the following, each of the constituent elements will be described.

Coil

As shown in FIGS. 1 and 2, the coil 2 of the present example includes the tubular wound portions 2a and 2b having two separate windings 2w respectively wound therearound in a spiral shape, and one end of each of the windings 2w and 2w are joined through welding or crimping to form an integrated object. Typically, a terminal member (not shown) is attached to the other end of each of the windings 2w and 2w, and an external device such as a power supply that supplies power to the coil 2 is connected to the terminal member. The wound portions 2a and 2b are disposed side by side such that the axes thereof are parallel. Each of the windings 2w and 2w of the present example is a co-called enameled wire, which is a coated flat rectangular wire including a flat rectangular wire conductor made of copper or the like and an insulating coating made of polyamide imide or the like that covers the outer circumference of the conductor. Both of the wound portions 2a and 2b of the present example are edgewise coils having a quadrangular tube shape with rounded corners, and are identical in shape, winding direction, and number of turns. As the coil 2, a known coil including two wound portions 2a and 2b disposed side by side can be used. For example, the wound portions 2a and 2b can be formed by a single continuous winding 2w. The shape, size, number of turns, and the pull-out direction of the ends of the winding 2w of the wound portions 2a and 2b can be changed as appropriate.

The entire outer circumferential surface of the coil 2 of the present example is exposed without being covered by the resin mold portion 6, and a part (mainly, the inner side resin portions 61) of the resin mold portion 6 is on the inner side of the wound portions 2a and 2b.

Magnetic Core

The magnetic core 3 of the present example includes a plurality of inner core pieces 31, the first outer core piece 32A, and the second outer core piece 32B (hereinafter occasionally referred to collectively as "outer core pieces 32A and 32B"), and a plurality of gap portions, and is integrally held by the resin mold portion 6.

Both of the inner core pieces 31 of the present example have the same shape and the same size as shown in FIGS. 2 and 9. Specifically, each of the inner core pieces 31 has a cubic shape (see also FIG. 3), and includes chamfered portions 31c formed by C-chamfering the corner portions thereof. By providing the chamfered portions 31c, the corner portions of each inner core piece 31 are less likely to be chipped, and the strength can be enhanced. As shown in FIGS. 3 and 9, an inner side wall portion 513 of each inner side divided piece 510 that constitutes an inner side interposed portion is interposed between adjacent inner core pieces 31 and 31. All of the inner side wall portion 513, the interposed resin portion 63 provided between the first outer core piece 32A and the inner core pieces 31, and the interposed wall portion 523 disposed between the inner core pieces 31 and the second outer core piece 32B form gap portions. The plurality of inner core pieces 31 and the inner side wall portions 513 are held in a columnar configuration by the inner side resin portions 61 of the resin mold portion 6 so as to form an inner core piece group.

Both of the outer core pieces 32A and 32B of the present example have the same shape and the same size as shown in FIG. 2. Specifically, each of the outer core pieces 32A and 32B is a columnar body whose installation surface (lower surface) and the surface opposite thereto (upper surface) are dome-shaped, and an inner end face 32e that is disposed so as to oppose the inner core pieces 31 is formed as a uniform and flat face. In addition, each of the outer core pieces 32A and 32B is sized so as to protrude from the installation surface of the inner core pieces 31 and the surface opposite thereto (FIG. 8).

The inner core pieces 31 and the outer core pieces 32A and 32B are each mainly composed of a soft magnetic material. Examples of the soft magnetic material include soft magnetic metals such as iron and iron alloys (e.g., an Fe—Si alloy, an Fe—Ni alloy). Examples of the inner core pieces 31 and the outer core pieces 32A and 32B include a green compact obtained by compression molding a powder composed of a soft magnetic material or a coated power including an insulating coating, and a molded article of a composite material containing a soft magnetic powder and a resin.

Interposed Member

Overview

The interposed member 5 is typically composed of an insulating material, and functions, for example, as an insulating member between the coil 2 and the magnetic core 3, and a positioning member for positioning the inner core pieces 31 and the outer core pieces 32A and 32B relative to the wound portions 2a and 2b. In particular, in the reactor 1 of Embodiment 1, the interposed member 5 also functions as a member that forms a flow path for unsolidified resin when forming the resin mold portion 6 in the manufacturing process of the reactor 1. As described above, the interposed member 5 of the present example includes the inner side interposed portion and the outer side interposed portion.

Outer Side Interposed Portion

First, a description will be given of the frame portion 52A disposed on the first outer core piece 32A with reference mainly to FIGS. 2 and 4, focusing on the first through holes 522.

The frame portion 52A of the present example includes, at the central portion thereof, two first through holes 522 provided parallel to each other, which have the same shape and the same size. In a state in which the inner core pieces 31 are assembled to the frame portion 52A as shown in phantom by the dashed double-dotted line on the right side in FIG. 4, the frame portion 52A of the present example includes protruding plate pieces 526 that have a square shape so as to cover the four corner portions of inner core pieces 31, and the first through holes 522 have a cross shape. In the above-described assembled state, except for the corner portions of the inner core piece 31, much of the end face of the inner core piece 31 is exposed from the first through holes 522. The size of the opening of each of the first through holes 522 is adjusted such that a plurality of gaps g (four locations on the upper and lower sides and the left and right sides (inner and outer sides) in FIG. 4) are provided around the inner core piece 31 in the above-described assembled state. The protruding plate pieces 526 are interposed between the first outer core piece 32A and the inner core pieces 31. Accordingly, in a state in which the first outer core piece 32A, the frame portion 52A, and the inner core pieces 31 are assembled, a gap corresponding to the thickness of the protruding plate pieces 526 is provided between the first outer core piece 32A and the inner core pieces 31. This gap and the above-described gaps g are used as flow paths for unsolidified resin so as to introduce the unsolidified resin into the coil interior spaces from the first outer core piece 32A side. The constituent resin of the resin mold portion 6 is filled inside the gaps g. The constituent resin filled inside the above-described gap corresponding to the thickness of the protruding plate pieces 526 mainly constitutes the interposed resin portions 63, and functions as the gap portions as described above.

The shape, size, and the like of the first through holes 522 may be changed as appropriate. For example, the first through holes 522 may have a shape completely different from the shape of the inner core pieces 31, or may be a circular hole, for example.

Next, a description will be given of the plate-shaped portion 52B disposed on the second outer core piece 32B side mainly with reference to FIG. 2, and FIGS. 5 to 7, focusing on the interposed wall portions 523.

In the plate-shaped portion 52B of the present example, no large through hole such as the first through hole 522 is provided in portions corresponding to the positions of the frame portion 52A at which the first through holes 522 are formed, and the interposed wall portions 523 having a square shape are mainly present. Accordingly, much of the end face of the inner core piece 31 is covered by the interposed wall portions 523 in a state in which the inner core pieces 31 are assembled to the plate-shaped portion 52B as shown in phantom by the dashed double-dotted lines on the right side in FIG. 5. Note, however, that a plurality of small through holes are locally provided in the plate-shaped portion 52B. Specifically, in the above-described assembled state, the second through holes 525u and 525s and the third through holes 525d and 525i are provided so as to overlap the upper and outer edges, and the lower and inner edges of each inner core piece 31. A total opening area of the four through holes 525u and 525s, 525d and 525i is sufficiently smaller than the opening area of a single first through hole 522. In the present example, all of the through holes 525u, 525s, 525d, and 525i are narrow rectangular holes. The upper and lower holes (525u, 525d) have an equal opening area, the left and right (inner and outer) holes (525s, 525i) have an equal opening area, and the opening area of the upper and lower holes and the opening area of the left and right holes are different.

In a state in which the inner core pieces 31 are assembled to the plate-shaped portion 52B as described above, a portion of the four through holes 525u, 525s, 525d, and 525i is still in communication with the front and back sides thereof, and the end face of the inner core piece 31 is locally exposed from the remaining portion of the four through holes 525u, 525s, 525d and 525i. A portion of the through holes 525u, 525s, 525d, and 525i that is kept in a communication state is used as a flow path for unsolidified resin, and the constituent resin of the resin mold portion 6 is filled therein.

In a state in which the inner core pieces 31, the plate-shaped portion 52B, and the second outer core piece 32B are assembled, a portion of the second through holes 525u and 525s is still in communication with the front and back sides thereof, and gaps G are provided as shown in FIG. 5. The rest of the second through holes 525u and 525s and all of the third through holes 525d and 525i are closed by the inner end face 32e of the second outer core piece 32B as shown in phantom by the dashed double-dotted lines in FIG. 5. The gap G is used as a flow path for unsolidified resin, and allows the unsolidified resin to flow from the coil interior space toward the second outer core piece 32B. The size of the opening of the second through holes 525u and 525s is adjusted so as to be able to secure the gaps G in the above-described assembled state.

Thus, in the manufacturing process of the reactor 1, the first through holes 522 and 522 of the frame portion 52A, the second through holes 525u and 525s of the plate-shaped portion 52B, and so forth are used as a flow path for unsolidified resin to form the resin mold portion 6. Also, the interposed wall portions 523 of the plate-shaped portion 52B function as members that inhibit flows of the unsolidified resin from merging between the inner core pieces 31 and the second outer core piece 32B. Note that the interposed wall portions 523 also function as the gap portions as described above.

The number, shape, size, placement position and the like of the second through holes and the third through holes can be changed as appropriate. For example, it is possible to provide one second through hole and one third through hole, omit the third through hole, form at least one of the second through hole and the third through hole as a round hole, or make all the opening areas equal. Each of the second through hole and the third through hole of the present example is provided at positions at which the portions of the opening edge thereof that are located on the outer circumferential side coincide with the upper and lower edge portions and the inner and outer edge portions of the opening edge of the first through hole 522. As shown in FIG. 7, as viewed from the first outer core piece 32A side in a state in which the frame portion 52A, the plate-shaped portion 52B, and the second outer core piece 32B are assembled, each first through hole 522 overlaps the four through holes 525*u*, 525*s*, 525*d* and 525*i*, and the upper side region and the outer side region (the gap g on the upper side and the gap g on the outer side in FIG. 4) of the first through hole 522 and a portion (the gaps G in FIG. 5) of the second through holes 525*u* and 525*s* form gaps in communication with one another. The placement positions of the second through holes 525*u* and 525*s* can be changed as appropriate within a range that allows the formation of spaces that are in communication with one another from the coil interior space toward the second outer core piece 32B even after the inner core pieces 31 and the outer core pieces 32A and 32B are assembled.

Common Matters

Next, a description will be given of components common to the frame portion 52A and the plate-shaped portion 52B with reference mainly to FIG. 2, FIGS. 4 to 6, and FIG. 8.

Protruding tube portions 5200 to which the inner core pieces 31 are fitted are provided on the wound portions 2*a*, 2*b* sides (hereinafter referred to as "coil sides") of the frame portion 52A and the plate-shaped portion 52B of the present example, respectively, and recesses 527 to which inner end faces 32*e* of the outer core pieces 32A and 32B and the vicinity thereof are respectively fitted are provided on the outer core pieces 32A, 32B sides (hereinafter referred to as "outer core sides").

The frame portion 52A of the present example includes a quadrangular tube-shaped protruding tube portion 5200 (FIG. 8) protruding from the vicinity of the opening edge of each first through hole 522 toward the wound portions 2*a* and 2*b*, and surrounding the outer circumference of the inner core piece 31. The plate-shaped portion 52B includes a quadrangular tube-shaped protruding tube portion 5200 (FIGS. 2, 8) protruding from the vicinity of the edge portions located on the outer circumference side of the opening edges of the four through holes 525*u*, 525*s*, 525*d* and 525*i*, toward the wound portions 2*a* and 2*b*, and surrounding the outer circumference of the inner core piece 31. Each of the protruding tube portions 5200 include bar-shaped projecting pieces 5211 that are provided so as to extend from corner portions along the tube axial direction, and to cover the corner portions (here, the chamfered portions 31*c*) of the inner core pieces 31. One end (free end) of each projecting piece 5211 is provided in a shape capable of engaging with an end of the projecting piece 511 of an inner side divided piece 510, which will be described later (the details will be described later). Fitting the inner core piece 31 to the protruding tube portion 5200 enables the inner core piece 31 to be positioned relative to the frame portion 52A and the plate-shaped portion 52B. The protruding length of the protruding tube portion 5200 from the opening edge described above can be selected as appropriate within a range that enables the positioning of the inner core piece 31, and can be reduced to a length less than or equal to the length of the inner core piece 31 in the axial direction as shown in FIG. 8. Here, the thickness of the projecting piece 5211 and the thickness of the protruding tube portion 5200 are set to be approximately equal to the thickness of the coil interior space. Accordingly, the distance between the inner circumferential surfaces of the wound portions 2*a* and 2*b* and the inner core piece 31 is maintained by the protruding tube portions 5200 and the projecting pieces 5211.

In addition, fitting grooves to which the pulled-out portions of the windings 2*w* and 2*w* that have been pulled out from the vicinity of the end faces of the wound portions 2*a* and 2*b* and from the wound portions 2*a* and 2*b* are fitted are provided in the coil side-regions of the frame portion 52A and the plate-shaped portion 52B, (see the coil side of the plate-shaped portion 52B in FIG. 2). By fitting the end faces of the wound portions 2*a* and 2*b* and so forth into the fitting grooves, the wound portions 2*a* and 2*b* can be brought into close contact with the frame portion 52A and the plate-shaped portion 52B, thus appropriately positioning these components. Further, this close contact makes it easy to prevent the above-described unsolidified resin from leaking from the inside of the wound portions 2*a* and 2*b* to the outside of the coil 2. By fitting the inner core pieces 31 into the protruding tube portions 5200, and fitting the outer core pieces 32A and 32B into the recesses 527, the inner core pieces 31 and the outer core pieces 32A and 32B can be appropriately positioned relative to the frame portion 52A and the plate-shaped portion 52B. Hence, the wound portions 2*a* and 2*b* can be appropriately positioned relative to the inner core pieces 31 and the outer core pieces 32A and 32B through the frame portion 52A and the plate-shaped portion 52B.

The size of the opening of the recesses 527 provided on the outer core side of the frame portion 52A and the plate-shaped portion 52B is larger than the size of the outer core pieces 32A and 32B. The size of the above-described opening is adjusted such that L-shaped gaps are formed between the recesses 527 and the outer circumferential surfaces (in FIGS. 4 and 5, the upper surface and the left and right surfaces) of the outer core pieces 32A and 32B in a state in which the outer core pieces 32A and 32B are fitted, as shown in phantom by the dashed double-dotted line in FIGS. 4 and 5. The above-described opening has a shape formed by adding the shapes formed by the above-described L-shaped gaps to the outer shape of the outer core pieces 32A and 32B.

On the outer core side of the frame portion 52A of the present example, two first through holes 522 are open in a bottom surface 528 (the surface with which the inner end faces 32*e* of the outer core pieces 32A and 32B are in contact) of the recess 527 as shown in FIG. 4. On the outer core side of the plate-shaped portion 52B of the present example, a part of the bottom surface 528 of the recess 527 is formed by the interposed wall portions 523 and 523 as shown in FIG. 5. In the present example, when the above-described L-shaped gaps in the frame portion 52A are viewed from the first outer core piece 32A side, the upper regions and the outer side regions of the first through holes 522 and 522 can be seen, and these regions are in communication with the above-described gaps g. The L-shaped gaps are used as the supply start location of unsolithfied resin that forms the resin mold portion 6. Providing the recesses 527 at the central regions of the frame portion 52A and the plate-shaped portion 52B makes it possible to reduce the thickness of the central parts to be smaller than the thickness of the peripheral edge portions of the frame portion 52A and the plate-shaped portion 52B, thus making it possible to reduce the weight of the members.

Although the sizes of the frame portion 52A and the plate-shaped portion 52B of the present example are adjusted as follows, the sizes can be changed as appropriate. In a state in which the frame portion 52A and the plate-shaped portion 52B are assembled to the coil 2 and the outer core pieces 32A and 32B, the installation surfaces (lower surfaces) of the wound portions 2a and 2b do not protrude from the installation surfaces (lower surfaces) of the frame portion 52A and the plate-shaped portion 52B (FIG. 8). The side surfaces (left and right surfaces) of the frame portion 52A and the plate-shaped portion 52B are substantially flush with the side surfaces (left and right surfaces) of the wound portions 2a and 2b (FIG. 3). The surfaces (upper surfaces) opposite to the installation surfaces of the frame portion 52A and the plate-shaped portion 52B are disposed at a position higher than the surfaces (upper surfaces) opposite to the installation surfaces of the wound portions 2a and 2b and the outer core pieces 32A and 32B (FIG. 8). Accordingly, in the above-described assembled state, except for end portions of the windings 2w and 2w, the coil 2 does not bulge from the frame portion 52A and the plate-shaped portion 52B.

Inner Side Interposed Portion

The inner side interposed portion of the present example includes a plurality of inner side divided pieces 510 that can be separated in the axial direction of the wound portions 2a and 2b as shown in FIGS. 2, 8, and 9. In the present example, the inner side divided pieces 510 have the same shape and the same size, and therefore, one inner side divided piece 510 will be described in the following.

As shown in FIG. 9, the inner side divided piece 510 of the present example includes an inner side wall portion 513 interposed between adjacent inner core pieces 31 and 31, and projecting pieces 511 coupled to the inner side wall portion 513 and disposed on the outer circumferential surface of the inner core piece 31. Further, the inner side divided piece 510 of the present example includes a quadrangular tube-shaped surrounding wall portion 512 surrounding the outer periphery of the rectangular solid-shaped inner core piece 31, and supporting the inner core piece 31 with the inner circumferential surface of the surrounding wall portion 512. The inner side wall portion 513 of the present example is a flat plate member that closes the inside of the quadrangular tube constituted by the surrounding wall portion 512, and is sandwiched between the adjacent inner core pieces 31 and 31 so as to function as a gap portion. The projecting pieces 511 of the present example are bar-shaped members extending from the corner portions of the quadrangular tube-shaped surrounding wall portion 512 along the tube axial direction, and protrude to opposite sides across the surrounding wall portion 512. One end of each of the projecting pieces 511 engages with the projecting piece 511 of another inner side divided piece 510 adjacent thereto, and the other end thereof engages with the projecting piece 5211 provided on the above-described protruding tube portion 5200 (FIG. 8). As a result of the projecting pieces 511 and 511 of the adjacent inner side divided pieces 510 engaging with each other, and the projecting pieces 511 and 5211 engaging with each other, bar-shaped members that are longitudinally attached over the entire length of the inner core piece group are constructed (FIG. 8). These longitudinally attached members function as partition portions that divide the coil interior space in the circumferential direction. Opposite sides of each partition portion are used as flow paths for the unsolidified resin when forming the resin mold portion 6. The flow path for the unsolidified resin can be formed in the coil interior space in accordance with the number of the partition portions.

In the present example, each of the inner side divided pieces 510 includes a total of four projecting pieces 511 so as to cover the four corner portions (chamfered portions 31c) of the inner core piece 31. Accordingly, the above-described longitudinally attached members divide one coil interior space in the circumferential direction thereof into a total of four regions, namely, upper, lower, left, and right regions, and each of the regions is used as an above-described flow path for unsolidified resin. To secure the above-described flow path, the thickness of the projecting pieces 511 is set to be generally equal to the thickness of the coil interior space, as with the case of the thickness of the above-described projecting pieces 5211.

Further, at all of the four corner portions of the inner core piece group, the chamfered portions 31c are covered over the entire length thereof by the above-described longitudinally attached members. Accordingly, the longitudinally attached members can prevent the packing pressure of the unsolidified resin from being focused at the corner portions of the inner core piece 31 during formation of the resin mold portion 6. As a result, it is possible to prevent the corner portions of the inner core piece 31 from being starting points of cracking due to stress concentrating thereon, thus preventing the occurrence of cracking.

In the present example, ends of the projecting pieces 511 and 5211 are formed in stepped shapes that mesh with each other as shown in FIG. 8. However, the shapes may be changed to appropriate engaging shapes such as a protrusion and a cavity. In particular, it is preferable that the engaging shapes are selected such that the length of the joint between the engaging portions is as long as possible. The reason is that the longer the length of the joint, the longer the leaking distance can be from one region divided by the partition portion to another region, or in other words, merging of flows of leaked unsolidified resin can be prevented. With this engagement, the manufacturing errors of the inner side divided pieces 510 and the protruding tube portions 5200 can also be absorbed.

In addition, the number, the protruding length, the placement position relative to the quadrangular tube (surrounding wall portion 512), the shape, and the like of the projecting pieces 511 can be changed as appropriate. For example, it is possible to provide one projecting piece 511 and one projecting piece 5211, and form the coil interior space as one region that is divided in the circumferential direction by the above-described longitudinally attached members, but is continuous (region having a C-shaped horizontal cross section). Alternatively, the projecting pieces 511 and 5211 may be provided only at corner portions that are located at diagonally opposite corners or opposite sides of the four corner portions of the inner core piece 31, thus dividing the coil interior space into two regions. The smaller the number of divided regions in the coil interior space, the larger the flow path cross-sectional area for the above-described unsolidified resin in each region can be, and the flowability of the unsolidified resin is enhanced. Alternatively, the projecting pieces 511 and 5211 may be provided at portions of each inner core piece 31 other than the four corner portions. Alternatively, the projecting pieces 511 may be formed as an oblique bar member extending so as to intersect the axial direction of the quadrangular tube, or may be formed as a corrugated bar member.

The formed circumferential direction length of the inner core piece 31 in the surrounding wall portion 512, the width (the length along the axial direction of the tube formed by the surrounding wall portion 512) of the surrounding wall portion 512, the thickness of the surrounding wall portion 512, and the like can be changed as appropriate. As described above, the surrounding wall portion 512 of the present example has a tubular shape that surrounds the entire outer circumferential surface of the inner core piece 31. However, the surrounding wall portion 512 may surround only a portion, in the circumferential direction, of the outer circumferential surface of the inner core piece 31 (in Embodiment 2, only the lower surface of the inner core piece 31), or may be omitted. Preferably, the thickness of the surrounding wall portion 512 is as small as possible. The reason for this is that in the present example, the region in which the surrounding wall portion 512 is disposed is used as a flow path for unsolidified resin when forming the resin mold portion 6, and, therefore, the smaller the thickness of the surrounding wall portion 512, the larger the flow path cross-sectional area can be, and the flowability of the unsolidified resin is enhanced. Here, the thickness of the surrounding wall portion 512 is sufficiently smaller than the thickness of the projecting piece 511, and it can be said that, as viewed from the projecting piece 511, the outer circumferential surface of the inner core piece 31 and the placement portions of the surrounding wall portion 512 are recessed portions (see FIG. 9).

The inner side wall portion 513 of the present example is a flat plate member having a shape and size corresponding to those of an end face of the inner core piece 31, and functions as one of the gap portions as described above. The thickness of the inner side wall portion 513 is adjusted so as to correspond to a predetermined gap length.

Constituent Material

Examples of the constituent material of the interposed member 5 include insulating materials such as various resins. Examples thereof include thermoplastic resins including polyphenylene sulfide (PPS) resins, polytetrafluoroethylene (PTFE) resins, liquid crystal polymers (LCPs), polyamide (PA) resins such as nylon 6 and nylon 66, polybutylene terephthalate (PBT) resins, and acrylonitrile-butadiene-styrene (ABS) resins. Alternative examples thereof include thermosetting resins such as unsaturated polyester resins, epoxy resins, urethane resins, and silicone resins. The interposed member 5 can be manufactured by a known molding method such as injection molding.

Flow Path for Unsolidified Resin

In the manufacturing stage of the reactor 1, in a combined body 10 obtained by assembling the wound portions 2a and 2b of the coil 2, the inner core piece 31, the outer core pieces 32A and 32B, and the interposed member 5, the gaps formed thereby are used as a flow path for unsolidified resin when forming the resin mold portion 6 as described above. In the present example, a continuous space, including the above-described L-shaped gap formed by the recess 527 of the frame portion 52A and the first outer core piece 32A, the space (including a gap between the first outer core piece 32A formed by the protruding plate piece 526 and the inner core piece 31) inside the first through hole 522, a portion of the coil interior space (the regions partitioned by the above-described projecting pieces 5211, 511), and the second through holes 525u and 525s of the plate-shaped portion 52B, is used as the above-described flow path. When the combined body 10 is housed in a molding die for the resin mold portion 6, predetermined gaps are provided between the inner circumferential surface of the molding die and the outer circumferential surface of the outer core pieces 32A and 32B. These predetermined gaps constitute a part of the above-described flow path. Unsolidified resin is filled inside the above-described flow path, thus forming a resin mold portion 6.

Resin Mold Portion

As shown in FIG. 3, the resin mold portion 6 of the present example covers portions exposed from the interposed member 5 in the combination of the first outer core piece 32A, the plurality of inner core pieces 31, the second outer core piece 32B, and the interposed member 5. As described above, the resin mold portion 6 includes the inner side resin portions 61 and the outer side resin portions 62, extends continuously from the outer side resin portion 62 on the first outer core piece 32A side to the outer side resin portion 62 on the second outer core piece 32B side through the inner side resin portions 61 in the coil interior space, and holds the combination of the above-described core pieces and the interposed member 5 together.

Inner Side Resin Portion

The inner side resin portions 61 of the present example are provided on opposite sides of the partition portion (here, the longitudinally attached members formed by engagement between the above-described projecting pieces 5211 and 511) that partitions the coil interior space into a plurality of regions in the circumferential direction thereof. In the present example, the inner side resin portions 61 are provided in a total of four regions, namely, upper, lower, left, and right regions, in the coil interior space as described above. The outer circumferential surfaces of the inner core pieces 31 and the surrounding wall portions 512 of the inner side divided pieces 510 are covered by the inner side resin portions 61, and the protruding tube portions 5200 and the projecting pieces 5211 and 511 are substantially not covered by the inner side resin portions 61 (FIG. 8).

Outer Side Resin Portion

The outer side resin portions 62 mainly cover, of the outer circumferential surfaces of the outer core pieces 32A and 32B, portions exposed from the frame portion 52A and the plate-shaped portion 52B. The outer side resin portions 62 of the present example also cover a portion of the surfaces of the frame portion 52A and the plate-shaped portion 52B on the outer core side (FIGS. 1, 3). Further, the installation surfaces (lower surfaces) of the outer side resin portions 62 of the present example are flush with the installation surfaces (lower surfaces) of the frame portion 52A and the late-shaped portion 52B (FIG. 8). In addition, the outer side resin portions 62 of the present example include a plurality of projecting pieces (a total of four projecting pieces in FIG. 3) protruding laterally to (in FIG. 3, left and right sides of) the outer core pieces 32A and 32B. The projecting pieces serve as mounting portions for fixing the reactor 1 to an installation target. Alternatively, the mounting portions may be omitted.

Interposed Resin Portion

As described above, the resin mold portion 6 includes the interposed resin portions 63 provided inside the first through holes 522 of the frame portion 52A (FIG. 3). The interposed resin portions 63 function as a coupling location between the outer side resin portion 62 on the first outer core piece 32A side and the inner side resin portion 61, and also function as one of the gap portions. The portion formed by the constituent resin of the resin mold portion 6 being filled inside the second through holes 525u and 525s functions as a coupling location between the inner side resin portion 61 and the outer side resin portion 62 on the second outer core piece 32B side. The third interposed resin portions 65 (FIG. 5) formed by the constituent resin of the resin mold portion 6 being filled inside the third through holes 525*d* and 525*i* are each sandwiched between the inner core pieces 31 and the second outer core piece 32B, and function as a coupling location between the inner core pieces 31 and the second outer core piece 32B.

Constituent Material

Examples of the constituent resin of the resin mold portion 6 include thermoplastic resins including PPS resins, PTFE resins, LCPs, PA resins such as nylon 6, nylon 66, nylon 10T, nylon 9T, and nylon 6T, and PBT resins. When these resins contain, for example, a filler with excellent thermal conductivity, a resin mold portion 6 with excellent heat dissipation can be obtained. When the constituent resin of the resin mold portion 6 is the same resin as the constituent resin of the interposed member 5, excellent bondability can be achieved. Moreover, the coefficient of thermal expansion of the resin mold portion 6 is identical to the coefficient of linear expansion of the interposed member 5, and thus it is possible to inhibit detachment and cracking caused by thermal stress. Injection molding or the like can be used to mold the resin mold portion 6.

Method for Manufacturing Reactor

The reactor 1 of Embodiment 1 can be manufactured, for example, by housing the combined body 10 including the coil 2, the inner core pieces 31, the outer core pieces 32A and 32B, and the interposed member 5 in a molding die (not shown) for the resin mold portion 6, and coating the above-described combination of the core pieces and the interposed member 5 with unsolidified resin.

In the present example, the above-described combination can be easily assembled, for example, by using the inner side wall portions 513 of the inner side divided pieces 510 for stopping the inner core pieces 31 through abutment, fitting the inner core pieces 31 into the protruding tube portions 5200 of the frame portion 52A and the plate-shaped portion 52B, fitting the outer core pieces 32A and 32B into the recesses 527 and 527 of the frame portion 52A and the plate-shaped portion 52B, and engaging the projecting pieces 5211 of the frame portion 52A and the plate-shaped portion 52B with the projecting pieces 511 of the inner side divided pieces 510.

With the combined body 10 housed in the molding die, unidirectional introduction in which the first outer core piece 32A side serves as the packing start side of the unsolidified resin, and the second outer core piece 32B side serves as the packing end side is performed as shown by the thick dotted arrows in FIG. 10. The unsolidified resin that has been introduced from the first outer core piece 32A side spreads over the entire first through hole 522 from the outer circumferential surface of the first outer core piece 32A through the above-described L-shaped gap, and flows into the coil interior spaces of the wound portions 2*a* and 2*b*. In the coil interior spaces, the unsolidified resin flows in four flow paths (a total of eight flow paths for the two wound portions 2*a* and 2*b*) provided on upper, lower, left, and right sides of the inner core pieces 31 via the partition portions (the above-described longitudinally attached members) as described above. Due to the partition portions, the four flows of the unsolidified resin in the coil interior space are substantially prevented from merging, and these resin flows are caused to flow to the plate-shaped portion 52B side. When the resin flows reach the plate-shaped portion 52B, the presence of the interposed wall portion 523 causes a portion of the unsolidified resin to flow from the inside of the coil interior space to the second outer core piece 32B through the second through holes 525*u* and 525*s*, and is filled inside the molding die. The rest of the unsolidified resin flows from the inside of the coil interior space through the third through holes 525*d* and 525*i*, and comes into contact with the inner end face 32*e* of the second outer core piece 32B, and is filled inside the third through holes 525*d* and 525*i*. Through this unidirectional packing, the outer side resin portion 62 covering the first outer core piece 32A of the resin mold portion 6, the interposed resin portion 63 located inside the first through hole 522, the inner side resin portion 61 located inside the coil interior space, the second interposed portion located inside the second through holes 525*u* and 525*s*, and the outer side resin portion 62 covering the second outer core piece 32B can be provided continuously.

Usage

The reactor 1 of Embodiment 1 can be used as a component of a circuit that performs a voltage raising operation or a voltage lowering operation, such as a component constituting any of various types of converters and power conversion devices. Examples of the converters include vehicle-mounted converters (typically, a DC-DC converter) mounted to vehicles such as a hybrid car, a plug-in hybrid car, an electric car, and a fuel cell vehicle, and a converter of an air conditioner.

Effects

While the reactor 1 of Embodiment 1 uses a magnetic core 3 formed as a combination of a plurality of core pieces (31, 32A, 32B), the rigidity of the magnetic core can be increased by integrating the magnetic core by using the resin mold portion 6. In particular, since the interposed member 5 includes the frame portion 52A provided with the first through holes 522 and the plate-shaped portion 52B including the interposed wall portions 523, the unidirectional introduction from the first outer core piece 32A side toward the second outer core piece 32B side can be performed when forming the resin mold portion 6 as described above. This unidirectional introduction can prevent the generation of welds between the first outer core piece 32A and the inner core pieces 31. Also, this unidirectional introduction and the interposed wall portions 523 can prevent the generation of welds between the inner core pieces 31 and the second outer core piece 32B. Accordingly, the reactor 1 of Embodiment 1 can prevent the generation of cracks caused by welds, and can be provided with a magnetic core 3 that has enhanced strength, and thus has enhanced strength.

The reactor 1 of the present example further achieves the following effects.

(1) Since the interposed member 5 includes the partition portions, and can divide the coil interior space in the circumferential direction thereof, and prevent the generation of welds in the coil interior space, the strength of the magnetic core 3 integrated by the resin mold portion 6 can be further increased.

(2) Since the above-described partition portions are longitudinally attached members formed by engaging the projecting pieces 5211 of the frame portion 52A and the plate-shaped portion 52B with the projecting pieces 511 of the inner side divided piece 510, the engaged state can be maintained such that the partition portion can be appropriately present, which also makes it possible to more reliably prevent the generation of welds in the coil interior space.

(3) Since the interposed member 5 includes the plurality of inner side divided pieces 510, and the contact area between the interposed member 5 and the resin mold portion 6 can be increased, it is possible to further increase the strength of the magnetic core 3 integrated by the resin mold portion 6.

(4) The strength of the magnetic core 3 integrated by the resin mold portion 6 can be further increased, for example, as per the following reasons: the contact area between the first outer core piece 32A and the inner core pieces 31 can be increased by the interposed resin portions 63 filled inside the first through holes 522 of the frame portion 52A, the contact area between the inner core pieces 31 and the second outer core piece 32B can be increased by the second interposed portions filled inside the second through holes 525u and 525s of the plate-shaped portion 52B, the plate-shaped portion 52B includes the plurality of third through holes 525d and 525i so as to increase the contact area between the interposed member 5 and the resin mold portion 6 by the third interposed resin portions 65 filled inside the third through holes 525d and 525i.

(5) Since the provision of the chamfered portions 31c at the corner portions of the inner core piece 31 makes it possible to increase the contact area between the inner core pieces 31 and the resin mold portion 6, the strength of the magnetic core 3 integrated by the resin mold portion 6 can be further increased.

(6) The provision of the chamfered portions 31c at the corner portions of the inner core piece 31 makes the corner portions less likely to be chipped, resulting in enhanced strength.

(7) By covering the corner portions (chamfered portions 31c) of the inner core pieces 31 by the projecting pieces 5211 and 511, it is possible to prevent the packing pressure of the resin mold portion 6 from being focused on the corner portions of the inner core pieces 31. Accordingly, it is possible to prevent the corner portions of the inner core pieces 31 from being the starting points of cracking due to stress concentrating there, and the corner portions are less likely to be chipped, resulting in enhanced strength.

(8) Since the above-described partition portions can be easily formed by assembling the inner core pieces 31, the outer core pieces 32A and 32B, and the interposed member 5, the combined body 10 has excellent ease of assembly.

(9) The provision of the resin mold portion 6 can be expected to achieve, for example, enhanced insulation between the wound portions 2a and 2b and the magnetic core 3, protection from the external environment, and, depending on the constituent material, enhanced heat dissipation.

(10) Although the surrounding wall portions 512 are provided, the thickness thereof is adjusted to sufficiently ensure the flow paths for unsolidified resin around the inner core pieces 31. Accordingly, the unsolidified resin can easily flow, and, therefore, the resin mold portion 6 has excellent manufacturability.

(11) A further size reduction can be achieved by, for example, reducing the thickness of the central portions of the frame portion 52A and the plate-shaped portion 52B, and providing the fitting grooves so as to allow the wound portions 2a and 2b to be brought into close contact with the frame portion 52A and the plate-shaped portion 52B.

(12) By setting the thicknesses of the peripheral edge portions of the frame portion 52A and the plate-shaped portion 52B to be relatively large, it is possible to make the frame portion 52A and the plate-shaped portion 52B less likely to undergo cracking at the time of forming the resin mold portion 6 even when the packing pressure is increased.

(13) The wound portions 2a and 2b are exposed to the external environment without being covered by the resin mold portion 6, and thus have excellent heat dissipation properties.

(14) Since the inner side divided pieces 510 each include an inner side wall portion 513, it is possible to inhibit variations in inductance, making it possible to easily maintain a predetermined inductance over a long period.

In addition, the reactor 1 of Embodiment 1 can include at least one of the following. The same applies to Embodiment 2 and modifications, which will be described later.

(a) A sensor (not shown) for measuring a physical quantity of the reactor 1, such as a temperature sensor, a current sensor, a voltage sensor, or a magnetic flux sensor, (b) a heat dissipation plate (e.g., a metal plate) that is mounted to at least a part of the outer circumferential surface of the coil 2, and (c) a bonding layer (e.g., an adhesive layer, preferably having excellent insulation) interposed between the installation surface of the reactor 1 and an installation target or the heat dissipation plate (b).

Embodiment 2

Hereinafter, a reactor of Embodiment 2 will be described with reference to FIGS. 11 and 12.

FIG. 11 only shows two inner core pieces 31, and two inner side divided pieces 530.

FIG. 12 is a cross-sectional view of the combination before the formation of the resin mold portion 6, taken along a plane parallel to the axial direction of the coil 2, showing only a part of the interior of the wound portion 2b.

The basic configuration of the reactor of Embodiment 2 is the same as that of the Embodiment 1, except that the shape of the inner side divided piece 530 is different from the shape of the inner side divided piece 510 shown in FIG. 9. To describe briefly, the inner side wall portion 513 shown in FIG. 9 is cut out into a U-shape as shown in FIG. 11, and the constituent resin of the resin mold portion 6 is filled inside a notch 514 as shown in FIG. 12. The U-shaped plate member (the inner side wall portion 515 on which the notch 514 is provided) and a part (the resin gap portion 60) of the resin mold portion 6 are interposed between adjacent inner core pieces 31 and 31. In the following, the inner side divided piece 530 and the points related thereto will be described in detail, and the detailed description has been omitted for the rest.

A magnetic core included in the reactor of Embodiment 2 includes a plurality of inner core pieces 31. An interposed member included in the reactor of Embodiment 2 includes, as an inner side interposed portion, a plurality of inner side divided pieces 530 that can be separated in the axial direction of the wound portion. As shown in FIG. 11, of the plurality of inner side divided pieces 530, the inner side wall portion 515 of at least one inner side divided piece 530 has, between adjacent inner core pieces 31 and 31, a notch 514 into which the constituent resin of the resin mold portion 6 is filled.

The inner side wall portion 515 of the present example is formed as a U-shaped flat plate member, and is provided with an upwardly open notch 514. The projected outer shape of the flat plate member is a rectangular shape corresponding to the end face shape of the inner core piece 31. In the present example, the size of the above-described flat plate member is adjusted such that, in a state in which the flat plate member is interposed between the inner core pieces 31 and 31, the side surfaces of the flat plat member do not protrude from the outer circumferential surfaces (except for the chamfered portions 31c) of the inner core pieces 31. FIG. 12 shows a case where the side surfaces of the above-described flat plate member are flush with the outer circumferential surfaces (except for the chamfered portions 31c) of the inner core piece 31. Also, in the present example, the surrounding wall portion 512 is not formed in a tubular shape, but is formed to have a shape and a size such that the surrounding wall portion 512 is disposed only on the installation surface side of the above-described flat plate member. In other words, the above-described flat plate member is provided upright with the surrounding wall portion 512 serving as the bottom surface. By forming the above-described flat plate member to have a size such that the flat member does not protrude from the outer circumferential surface of the inner core piece 31, or reducing the area of the region in which the surrounding wall portion 512 is formed, a large region of the inner core piece 31 that is exposed from the inner side divided piece 530 can be secured. As a result, a larger cross-sectional area of the flow path for unsolidified resin can be ensured when forming the resin mold portion 6, thus making it possible to easily form the inner side resin portion 61.

The shape and the size of the above-described notch 514 can be selected as appropriate. When the notch 514 has an upwardly open U-shape as in the present example, in a state in which the above-described flat plate member is interposed between adjacent inner core pieces 31 and 31, an upwardly open blind hole is provided between the inner core pieces 31 and 31 so as to correspond to the notch 514. At the time of forming the resin mold portion 6, the unsolidified resin flowing through the upper side region formed in the coil interior space by being partitioned by the partition portion flows into the above-described blind hole under its own weight. The flow of the unsolidified resin at this time is a unidirectional flow flowing downward from above, where the opening of the blind hole is located. Accordingly, the merging of the unsolidified resin flows and the formation of welds caused by such merging can be prevented between the adjacent inner core pieces 31 and 31.

As shown in FIG. 12, the resin mold portion 6 includes a resin gap portion 60 between the inner core pieces 31 and 31. The resin gap portion 60 is formed by the constituent resin of the resin mold portion 6 by being filled inside the above-described notch 514. The constituent resin inside the notch 514 can be expected to further achieve, for example, the function of integrally holding adjacent inner core pieces 31 and 31 by joining them together, and the function of increasing the contact area between the inner side divided pieces 530 and the resin mold portion 6 as compared with the case where the notch 514 is not provided. When these functions are expected to be achieved, the area in which the notch 514 is formed (the area in which the end face of the inner core piece 31 is exposed) may be further increased.

In addition, as with the inner side divided piece 510 described in Embodiment 1, at each of the corner portions of the above-described U-shaped flat plate member, a projecting piece 511 protruding to opposite sides (in FIG. 11, front and rear sides) across the flat plate member is provided. End portions of the projecting piece 511 engage, for example, with the projecting piece 511 of the adjacent inner side divided piece 530, and the projecting piece 5211 of the protruding tube portion 5200 described in Embodiment 1.

In addition to achieving the effect of Embodiment 1, the reactor of Embodiment 2 including the inner side divided piece 530 provided with the notch 514 as described above forms a gap portion between the adjacent inner core pieces 31 and 31 by using the inner side wall portion 515 and the resin gap portion 60. The distance between the inner core pieces 31 and 31 can be maintained over a long period of time by the inner side wall portion 515. The contact area between the inner side divided pieces 530 and the resin mold portion 6 can be increased by the resin gap portion 60 as compared with the case where the notch 514 is not provided. Accordingly, the reactor of Embodiment 2 can inhibit variations in inductance, can easily maintain a predetermined inductance over a long period of time, and also can increase the strength of the magnetic core 3, including the interposed member, that is achieved through integration by the resin mold portion 6.

Furthermore, the present example also achieves the following effects.

(X) Since the constituent resin of the resin mold portion 6 filled inside the notch 514 makes it easy to integrate adjacent inner core pieces 31 and 31, it is possible to further increase the strength of the magnetic core 3 integrated by the resin mold portion 6.

(Y) Since the number of surrounding wall portions 512 is smaller than that in Embodiment 1, the contact area between the inner core pieces 31 and the resin mold portion 6 can be increased as compared with the case where the number of the surrounding wall portions 512 is large. Accordingly, it is possible to further increase the strength of the magnetic core 3 integrated by the resin mold portion 6.

(Z) Since the peripheral edge portion of the inner side wall portion 515 (flat plate member) is interposed between the chamfered portions 31c and 31c in the adjacent inner core pieces 31 and 31 (FIG. 12), and the peripheral edge portion is fixed by the resin mold portion 6 (in particular, the inner side resin portion 61), it is possible to increase the bonding strength between the inner core piece 31 and the inner side divided piece 530. In this respect, the strength of the magnetic core 3, including the interposed member, that is achieved by the magnetic core 3 being integrated by the resin mold portion 6 can be further increased.

The present invention is not limited to these examples, and is intended to include all modifications which fall within the scope of the claims and the meaning and scope of equivalents thereof. For example, at least one of the following modifications may be made to Embodiments 1 and 2 described above.

A through hole is provided in at least one of the outer core pieces 32A, 32B, and the through hole is used as a flow path for unsolidified resin at the time of forming the resin mold portion 6.

For example, one opening of the above-described through holes provided in the first outer core piece 32A may be used as an introduction port of unsolidified resin, and the other opening may be provided so as to be in communication with the first through hole 522. Alternatively, for example, one opening of the above-described through holes provided in the second outer core piece 32B may be provided so as to be in communication with the second through holes 525u and 525s, or the like.

(B) The protruding tube portion 5200 may be omitted for at least one of the frame portion 52A and the plate-shaped portion 52B, and the inner side divided piece 510 may be provided in place of the protruding tube portion 5200.

(C) In the coil 2, the winding 2w may be a coated round wire including a round wire conductor and an insulating coating, or the wound portions 2a and 2b may have a tubular shape without any corner portions, such as a cylindrical shape, an oval shape, or a racetrack shape.

What is claimed is:
1. A reactor comprising:
a coil including a wound portion;
a magnetic core including at least one inner core piece disposed inside the wound portion, and a first outer core piece and a second outer core piece that are disposed outside the wound portion and that sandwich the inner core piece therebetween;

an interposed member interposed between the coil and the magnetic core; and a resin mold portion that covers at least a portion of a combination of the first outer core piece, the inner core piece, and the second outer core piece, wherein the interposed member includes:

a frame portion that has a first through hole in communication with front and back sides thereof, and that is interposed between the first outer core piece and the wound portion; and a plate-shaped portion interposed between the wound portion and the second outer core piece, the resin mold portion includes:

an interposed resin portion that is formed by a constituent resin of the resin mold portion being filled inside the first through hole, and that is sandwiched between the first outer core piece and the inner core piece;

an inner side resin portion that is formed by the constituent resin of the resin mold portion being filled inside a portion of a coil interior space located between the wound portion and the inner core piece; and an outer side resin portion that covers at least a portion of the first outer core piece and at least a portion of the second outer core piece, and the plate-shaped portion includes:

an interposed wall portion sandwiched between the inner core piece and the second outer core piece; and a second through hole that is provided locally in a portion other than the interposed wall portion, and inside of which the constituent resin of the resin mold portion is filled.

2. The reactor according to claim 1, wherein the interposed member includes an inner side interposed portion disposed in the coil interior space, the inner side interposed portion includes a partition portion that divides the coil interior space in a circumferential direction thereof, and the inner side resin portion is provided in a region on two sides of the partition portion.

3. The reactor according to claim 2, wherein the magnetic core includes a plurality of the inner core pieces, the inner side interposed portion includes a plurality of inner side divided pieces that each include an inner side wall portion interposed between adjacent ones of the inner core pieces, and a projecting piece coupled to the inner side wall portion and disposed on an outer circumferential surface of the inner core piece, and the partition portion is formed by the projecting pieces of the adjacent ones of the inner side divided pieces being engaged with each other.

4. The reactor according to claim 3, wherein the inner side wall portion of at least one of the plurality of inner side divided pieces includes, between the adjacent ones of the inner core pieces, a notch inside of which the constituent resin of the resin mold portion is filled, and the resin mold portion includes a resin gap portion formed by the constituent resin of the resin mold portion being filled inside the notch between the inner core pieces.

5. The reactor according to claim 1, wherein the plate-shaped portion further includes a third through hole, and the resin mold portion includes a third interposed resin portion that is formed by the constituent resin of the resin mold portion being filled inside the third through hole, and that is sandwiched between the inner core piece and the second outer core piece.

6. The reactor according to claim 2, wherein the plate-shaped portion further includes a third through hole, and the resin mold portion includes a third interposed resin portion that is formed by the constituent resin of the resin mold portion being filled inside the third through hole, and that is sandwiched between the inner core piece and the second outer core piece.

7. The reactor according to claim 3, wherein the plate-shaped portion further includes a third through hole, and the resin mold portion includes a third interposed resin portion that is formed by the constituent resin of the resin mold portion being filled inside the third through hole, and that is sandwiched between the inner core piece and the second outer core piece.

8. The reactor according to claim 4, wherein the plate-shaped portion further includes a third through hole, and the resin mold portion includes a third interposed resin portion that is formed by the constituent resin of the resin mold portion being filled inside the third through hole, and that is sandwiched between the inner core piece and the second outer core piece.

* * * * *